(12) United States Patent
Kuo (10) Patent No.: US 11,445,143 B2
(45) Date of Patent: Sep. 13, 2022

(54) METHOD AND SYSTEM FOR COOPERATIVELY COLLECTING VIDEO DATA FROM DRIVING RECORDERS

(71) Applicant: MiTAC Digital Technology Corporation, Taoyuan (TW)

(72) Inventor: Hsing-Ping Kuo, Taipei (TW)

(73) Assignee: MITAC Digital Technology Corporation, Taoyuan (TW)

( * ) Notice: Subject to any disclaimer, the term of this patent is extended or adjusted under 35 U.S.C. 154(b) by 0 days.

(21) Appl. No.: 17/001,732

(22) Filed: Aug. 25, 2020

(65) Prior Publication Data

US 2021/0067733 A1   Mar. 4, 2021

(30) Foreign Application Priority Data

Aug. 26, 2019   (TW) ................................. 108130483

(51) Int. Cl.
| | |
|---|---|
| *G06K 9/00* | (2022.01) |
| *G06K 9/62* | (2022.01) |
| *G11B 27/24* | (2006.01) |
| *H04N 5/247* | (2006.01) |
| *H04N 5/765* | (2006.01) |

(Continued)

(52) U.S. Cl.
CPC .......... *H04N 5/765* (2013.01); *G06K 9/6201* (2013.01); *G06K 9/6267* (2013.01); *G06V 20/40* (2022.01); *G11B 27/24* (2013.01); *H04N 5/2253* (2013.01); *H04N 5/247* (2013.01); *H04N 5/913* (2013.01); *H04N 7/181* (2013.01); *G06V 20/625* (2022.01); *G06V 2201/08* (2022.01); *G06V 2201/09* (2022.01); *H04N 2005/91357* (2013.01)

(58) Field of Classification Search
None
See application file for complete search history.

(56) References Cited

U.S. PATENT DOCUMENTS

| | | |
|---|---|---|
| 5,799,083 A | 8/1998 | Brothers et al. |
| 6,718,239 B2 | 4/2004 | Rayner |

(Continued)

FOREIGN PATENT DOCUMENTS

| | | |
|---|---|---|
| CN | 205830040 U | 12/2016 |
| CN | 105245842 B | 2/2019 |

(Continued)

OTHER PUBLICATIONS

Search Report appended to an Office Action, which was issued to Taiwanese counterpart application No. 108130483 by the TiPO dated May 11, 2020 with an English translation thereof.

*Primary Examiner* — Patricia I Young
(74) *Attorney, Agent, or Firm* — Hammer & Associates, P.C.

(57) ABSTRACT

A method for cooperatively collecting video data from driving recorders includes steps of: by a driving recorder serving as a requesting device, broadcasting a video request; by another driving recorder serving as a cooperative device, generating a video file in response to receipt of the video request, encrypting the video file to result in an encrypted file, and transmitting the encrypted file to a video file server; by the video file server, decrypting the encrypted file to result in the video file, storing the video file, and sending a success notification of video data collection to a user device based on contact information contained in pre-stored registration data.

20 Claims, 5 Drawing Sheets

(51) Int. Cl.
*H04N 5/77* (2006.01)
*H04N 5/91* (2006.01)
*H04N 5/913* (2006.01)
*H04N 7/18* (2006.01)
*H04N 5/225* (2006.01)
*G06V 20/40* (2022.01)
*G06V 20/62* (2022.01)

(56) References Cited

U.S. PATENT DOCUMENTS

| | | | |
|---|---|---|---|
| 6,795,759 | B2 | 9/2004 | Doyle |
| 6,834,110 | B1 * | 12/2004 | Marconcini ........... G06F 16/958 |
| | | | 380/239 |
| 2012/0194357 | A1 | 8/2012 | Ciolli |
| 2018/0109737 | A1 * | 4/2018 | Nakamura ......... H04N 5/23229 |
| 2018/0137698 | A1 * | 5/2018 | Yasuda ................... B60R 21/00 |

FOREIGN PATENT DOCUMENTS

| | | |
|---|---|---|
| KR | 101906709 B1 | 10/2018 |
| TW | 201227542 A | 7/2012 |
| TW | 201401233 A | 1/2014 |
| TW | 201409263 A | 3/2014 |
| TW | I516950 B | 1/2016 |
| TW | I616851 B | 3/2018 |
| TW | I633509 B | 8/2018 |
| TW | I654106 B | 3/2019 |

\* cited by examiner

METHOD AND SYSTEM FOR COOPERATIVELY COLLECTING VIDEO DATA FROM DRIVING RECORDERS

CROSS-REFERENCE TO RELATED APPLICATION

This application claims priority of Taiwanese Invention Patent Application No. 108130483, filed on Aug. 26, 2019.

FIELD

The disclosure relates to a method and a system for collecting video data, and more particularly to a method and a system for cooperatively collecting video data from driving recorders.

BACKGROUND

A driving recorder mounted on a vehicle is utilized to record video as evidence in the event of an accident (e.g., a traffic accident). To mitigate the risk of corruption of a whole recorded video file due to a power failure or a system crash, the driving recorder stores the video recorded every predetermined time period (e.g., every 3 minutes) as a separate video file in a memory card installed in the driving recorder, and hence the memory card may eventually store numerous recorded video files.

Conventionally, in order to pinpoint specific images of an accident, a user has to spend a lot of time and effort manually searching for specific one(s) of the recorded video files that correspond to the moment of occurrence of the target accident, and then manually inspect the specific one(s) of the recorded video files to find the desired images. Moreover, if the specific one(s) of the recorded video files is/are unusable because of file corruption or bad recording, it may be hard to find alternative sources of evidence. Further, in a scenario where there is only a single driving recorder mounted on the vehicle and the driving recorder is to record a front view of the vehicle, no video evidence can be obtained from the driving recorder should a collision occur at a lateral side or a rear side of the vehicle.

SUMMARY

Therefore, an object of the disclosure is to provide a method and a system for cooperatively collecting video data from driving recorders that can alleviate at least one of the drawbacks of the prior art.

According to one aspect of the disclosure, the system includes a plurality of driving recorders to be respectively mounted on a plurality of vehicles, and a video file server communicably connected to a communication network.

Each of the driving recorders includes a communication unit, an image capturing unit, a storage and a processor. The communication unit is communicably connected to the communication network, and supports wireless communication. The image capturing unit is configured to record video data at a supported frame rate when the vehicle on which the driving recorder is mounted is started. The storage is configured to store a device identifier which uniquely represents the driving recorders. The processor is electrically connected to the communication unit, the image capturing unit and the storage.

The video file server includes a device database, a video database and a management unit. The device database is configured to store plural entries of registration data which respectively correspond to the driving recorders. Each of the plural entries of registration data contains the device identifier that uniquely represents the respective one of the driving recorders, and a piece of contact information that corresponds to a user device assigned by a registered user of the respective one of the driving recorders.

The management unit is electrically connected to the device database and the video database.

For one of the driving recorders that serves as a requesting device, the processor of the requesting device is configured to, in response to one of occurrence of a predetermined driving event and receipt of a control input, control the communication unit to broadcast a video request by using wireless communication techniques. The video request contains the device identifier that is stored in the storage.

For each of at least one of the driving recorders that is within a predefined communication range with respect to the requesting device, and that serves as one of at least one cooperative device, the processor of the cooperative device is configured to, when in receipt of the video request via the communication unit from the requesting device, generate a video file in response to receipt of the video request. The video file contains the device identifier that uniquely represents the requesting device and that is contained in the video request, the device identifier that uniquely represents the cooperative device and that is stored in the storage, and video data that was recorded by the image capturing unit in a predefined time period related to a time point of receipt of the video request. The processor of the cooperative device is further configured to encrypt the video file thus generated to result in an encrypted file, and control the communication unit to transmit the encrypted file to the video file server by using wireless communication techniques.

The management unit of the video file server is configured to, for each of the encrypted file(s) received from the at least one cooperative device, decrypt the encrypted file to result in the video file, store the video file thus decrypted in the video database, search for one of the plural entries of registration data, the device identifier contained in which matches the device identifier which is contained in the video file that corresponds to one of said at least one cooperative device and which represents the requesting device, communicate with the user device based on the contact information contained in the one of the plural entries of registration data thus located upon the search, and send a success notification of video data collection to the user device.

According to another aspect of the disclosure, the method according to the disclosure is adapted to be implemented by the system that is previously described. The method includes steps of:

A) storing, by the video file server, the plural entries of registration data that respectively correspond to the driving recorders;

B) broadcasting, by one of the driving recorders that serves as the requesting device in response to one of occurrence of the predetermined driving event and receipt of the control input, the video request by using wireless communication techniques;

C) generating, by each of the at least one cooperative device, the video file in response to receipt of the video request;

D) by each of the at least one cooperative device, encrypting the video file thus generated to result in the encrypted file, and transmitting the encrypted file to the video file server by using wireless communication techniques;

E) by the video file server with respect to each of the encrypted file(s) received from the at least one cooperative device, decrypting the encrypted file received from the cooperative device to result in the video file, and storing the video file; and
F) by the video file server, searching for one of the plural entries of registration data, the device identifier contained in which matches the device identifier that is contained in the video file corresponding to one of the at least one cooperative device and that represents the requesting device, communicating with the user device based on the contact information contained in the one of the plural entries of registration data thus located after the search, and sending the success notification of video data collection to the user device.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
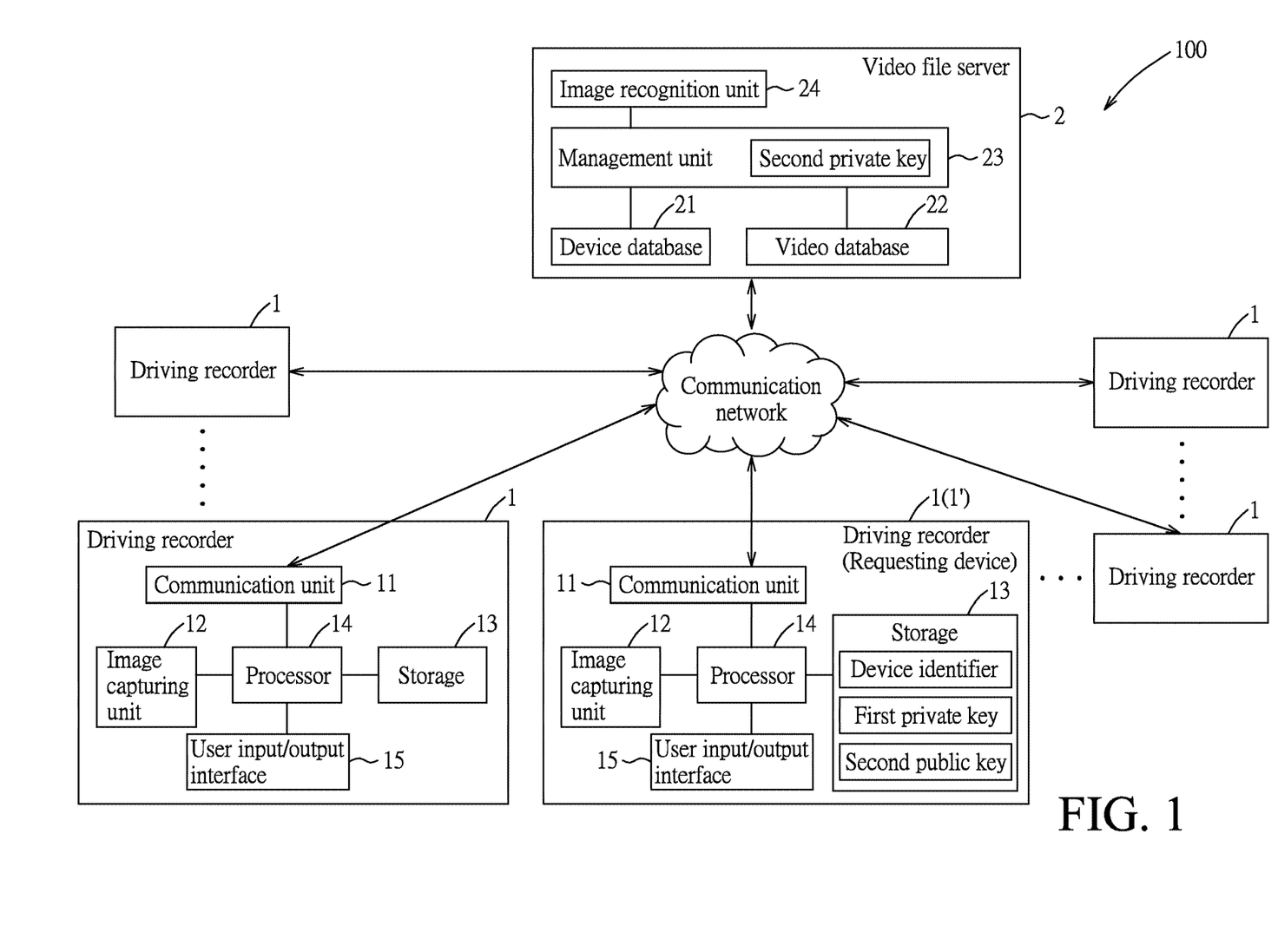
FIG. 1 is a block diagram illustrating an embodiment of a system for cooperatively collecting video data from driving recorders according to the disclosure.
Figure 4:
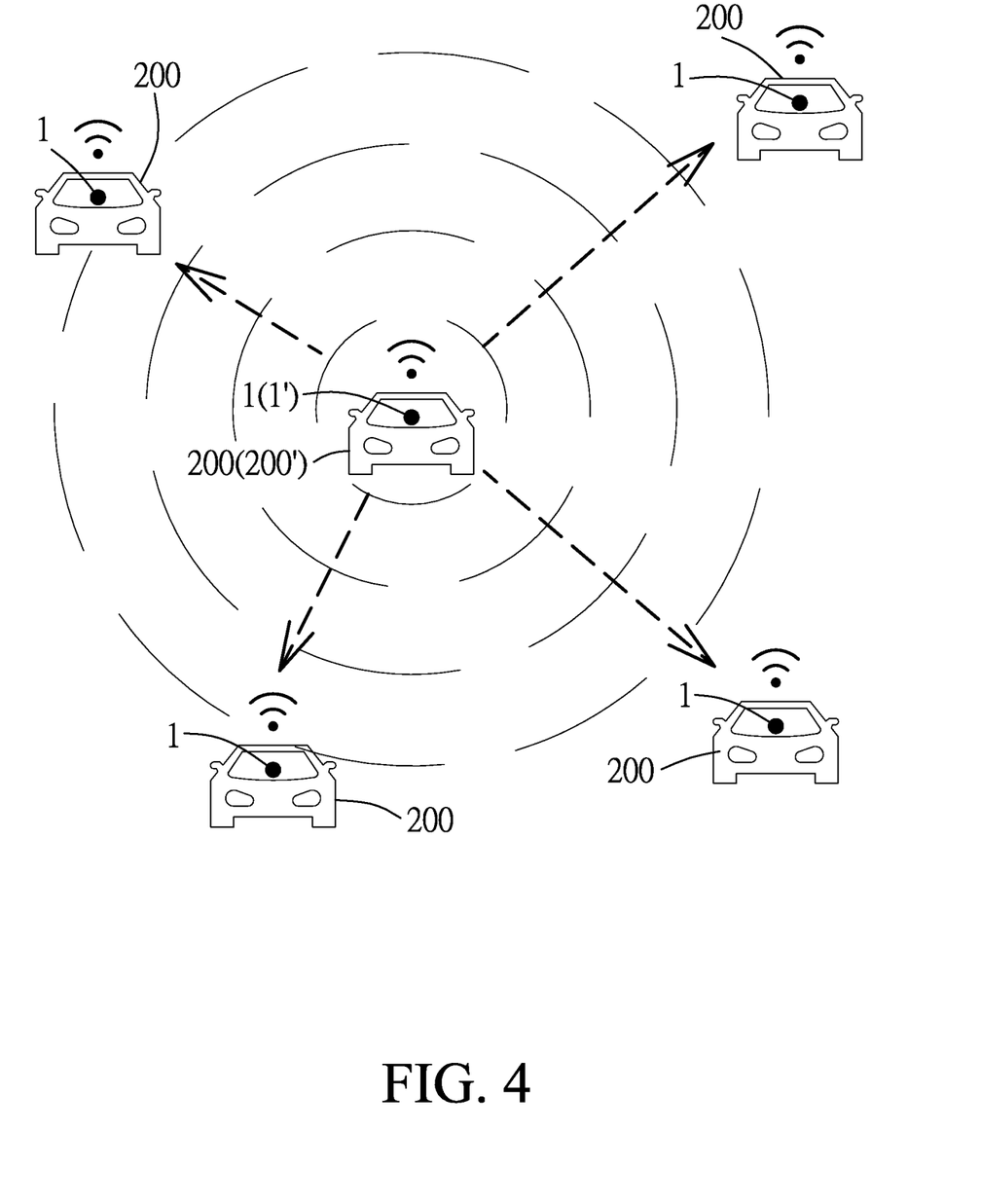
FIG. 4 is a schematic diagram illustrating an embodiment of one requesting device and four cooperative devices of the system according to the disclosure.

Referring to FIGS. 1 and 4, an embodiment of a system 100 for cooperatively collecting video data from driving recorders according to the disclosure is illustrated. The system 100 includes a plurality of driving recorders 1 that are adapted to be respectively mounted on a plurality of vehicles 200, and a video file server 2 that is communicably connected to a communication network.

Each of the driving recorders 1 includes a communication unit 11, an image capturing unit 12, a storage 13, a user input/output interface 15, and a processor 14 that is electrically connected to the communication unit 11, the image capturing unit 12, the storage 13 and the user input/output interface 15.

The communication unit 11 is communicably connected to the communication network, and supports wireless communication techniques (e.g., Long Term Evolution, LTE, and/or short-range wireless communications such as Wi-Fi and Bluetooth technologies). The communication unit 11 may be communicable with another communication unit 11 within a predefined communication range. In this embodiment, the communication unit 11 may be implemented by any circuit configurable/programmable in a software manner and/or hardware manner to implement functionalities discussed in this disclosure.

The image capturing unit 12 is configured to record video data at a supported frame rate when the vehicle 200 on which the driving recorder 1 is mounted is started. In this embodiment, the image capturing unit 12 records video data in a manner of loop recording. In this embodiment, the image capturing unit 12 is capable of capturing images (e.g., an image including a license plate of a front vehicle in front of the vehicle 200) within the range of thirty meters with respective to the image capturing unit 12 on a sunny day. The image capturing unit 12 may be implemented by a video camera or a digital video recorder (DVR), but is not limited thereto.

Before use, such as in a registration procedure for a user of one of the driving recorders 1, the storage 13 is configured to store a device identifier which uniquely represents the driving recorder 1, a first private key which is assigned to the driving recorder 1 and which is paired with a first public key, and a second public key which is paired with a second private key that is assigned to the video file server 2. The device identifier is utilized in authentication of identification of the driving recorder 1, the first private key is utilized for decryption, and the second public key is utilized for encryption. The storage 13 may be implemented to include a pluggable memory card (not shown) for storing the video data recorded by the image capturing unit 12 in the form of video files.

The user input/output interface 15 maybe implemented to include a touchscreen (not shown), but is not limited thereto. The user input/output interface 15 is configured to be operated by a user to generate a control input, and is configured to output information (e.g., display video).

The processor 14 supports video-related file processing, data access, and control of the communication unit 11, the image capturing unit 12 and the user input/output interface 15. In this embodiment, the processor 14 may be implemented by a central processing unit (CPU), a microprocessor, a microcontroller unit (MCU), or any circuit configurable/programmable in a software manner and/or hardware manner to implement functionalities discussed in this disclosure.

The video file server 2 may be implemented by a computing apparatus that is adapted to perform communication functions, and that is communicably connected to the communication network to serve as a cloud server. However, implementation of the video file server 2 is not limited to the disclosure herein and may vary in other embodiments. The video file server 2 includes a device database 21, a video database 22, a management unit 23 that is electrically connected to the device database 21 and the video database 22, and an image recognition unit 24 that is electrically connected to the management unit 23.

In this embodiment, the management unit 23 may be implemented by a combination of a processor (e.g., a central processing unit, CPU, a microprocessor, or a micro control unit, MCU) and a storage (e.g., computer memory, a hard disk drive, HDD, or a solid state disk, SSD), or may be implemented by a system on a chip, SOC, or any circuit configurable/programmable in a software manner and/or hardware manner to implement functionalities discussed in this disclosure.

Figure 2:
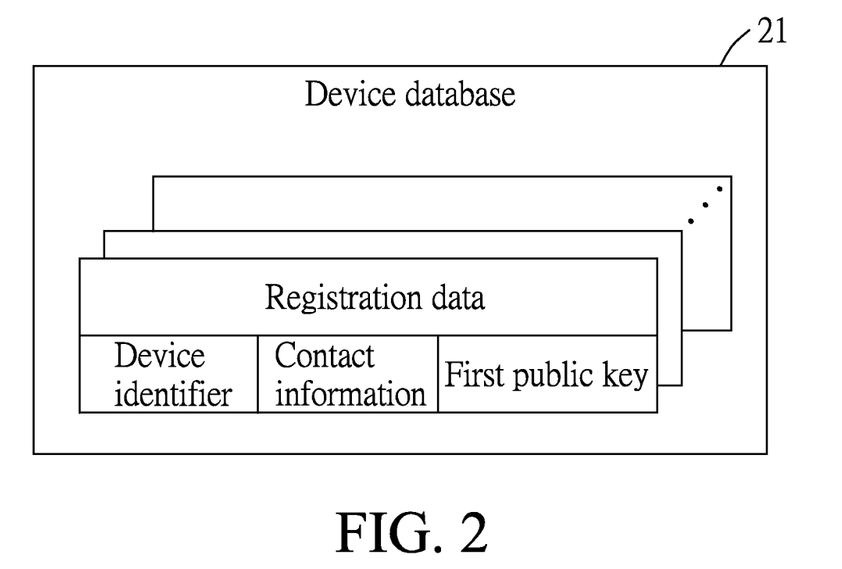
FIG. 2 is a block diagram illustrating an embodiment of a device database of a video file server of the system according to the disclosure.

Referring to FIG. 2, the management unit 23 is configured to store in advance the second private key, and to store, during the registration procedure, plural entries of registration data which respectively correspond to the driving recorders 1 in the device database 21. Each of the plural entries of registration data contains the first public key, the device identifier that uniquely represents the respective one of the driving recorders 1, and a piece of contact information that corresponds to a user device assigned by a registered user of the respective one of the driving recorders 1. The second private key is utilized for decryption, and the first public key is utilized for encryption. The user device may be a mobile device, such as a smartphone, but is not limited thereto. The piece of contact information may include one of a phone number, an Internet address, and an e-mail address, but is not limited thereto.

The processor 14 of one of the driving recorders 1 is configured to, in response to one of occurrence of a predetermined driving event and receipt of the control input, control the communication unit 11 of said one of the driving recorders 1 to broadcast a video request by using wireless communication techniques. The video request contains the device identifier that is stored in the storage 13 of said one of the driving recorders 1 and that uniquely represents said one of the driving recorders 1. Any one of the driving recorders 1 that is within the predefined communication range with respect to of said one of the driving recorders 1 and that has received the video request would serve as a cooperative device, while said one of the driving recorders 1 serves as a requesting device 1'.

Referring to an example shown in FIG. 4 for explanation, in response to occurrence of the predetermined driving event, e.g., deceleration (i.e., acceleration in a direction opposite to a moving direction of the vehicle) caused by emergency braking and sensed by an accelerometer (not shown) of the driving recorder 1 mounted on one of the vehicles 200 (denoted by the vehicle 200') reaching a preset value (e.g., one of 0.5 G, 1.5 G, 2.0 G, 2.5 G and 3.0 G), or in response to receipt of the control input generated by the user input/output interface 15 according to operation of a user (e.g., a driver or a passenger in the vehicle 200') when a traffic collision occurs, the driving recorder 1 mounted on the vehicle 200' serves as the requesting device 1' and broadcasts the video request. Other driving recorders 1 mounted on respective vehicles 200 that are within the predefined communication range serve as the cooperative devices (a total of four cooperative devices in the example depicted in FIG. 4). It should be noted that each of the driving recorders 1 may serve as either the requesting device 1' or the cooperative device based on whether the driving recorder broadcasts the video request or receives the video request.

For each of at least one of the driving recorders 1 that is within the predefined communication range with respect to the requesting device 1', and that serves as a cooperative device (i.e., there is at least one cooperative device), the processor 14 of the cooperative device is configured to, when receiving the video request from the requesting device 1' via the communication unit 11, generate a video file in response to receipt of the video request. The video file contains the device identifier that uniquely represents the requesting device 1' and that is contained in the video request, the device identifier that uniquely represents the cooperative device and that is stored in the storage 13, the video data that was recorded by the image capturing unit 12 in a predefined time period related to a time point of receipt of the video request, and a supported frame rate that is supported by the cooperative device.

In this embodiment, the predefined time period includes a first time interval right before the time point of receipt of the video request, and a second time interval right after the time point of receipt of the video request. The duration of the first time interval maybe five seconds, and the duration of the second time interval may be fifteen seconds. However, implementation of the predefined time period is not limited to the disclosure herein and may vary in other embodiments. For example, the duration of the predefined time period may be assigned based on practical needs such that the video data recording a target event (e.g., a traffic collision) could be sufficiently preserved by the cooperative device, especially actions that happened in the first time interval when the cooperative device has not yet received the video request broadcasted from the requesting device 1'. In one embodiment, the duration of the first time interval is determined based on an average of a time delay between broadcast of the video request and receipt of the video request.

Subsequently, the processor 14 of the cooperative device is further configured to encrypt the video file thus generated by utilizing the second public key stored in the storage 13 to result in an encrypted file, and to control the communication unit 11 to transmit the encrypted file to the video file server 2 by using wireless communication techniques.

In one embodiment, the processor 14 of each of the at least one cooperative device is further configured to control the user input/output interface 15 to display the video file before the processor 14 encrypts the video file and transmits the encrypted file via the communication device 11 to the video file server 2. After obtaining a confirmation input which is a user input via the user input/output interface 15, the processor 14 of the cooperative device is configured to encrypt the video file to result in the encrypted file, and to transmit the encrypted file via the communication device 11 to the video file server 2.

After that, the management unit 23 of the video file server 2 is configured to decrypt each encrypted file received from a corresponding one of the at least one cooperative device by utilizing the second private key stored therein to result in the video file, and to transmit the video file thus decrypted to the image recognition unit 24.

For each of the at least one cooperative device, the image recognition unit 24 is configured to perform image recognition on the video data contained in the corresponding video file that is transmitted by the management unit 23, and to determine whether the video data contains a video portion that matches a specific feature based on a result of performance of the image recognition. In this embodiment, the image recognition unit 24 may be implemented by any circuit configurable/programmable in a software manner and/or hardware manner to implement functionalities discussed in this disclosure. In this embodiment, the specific feature includes one of an appearance of a vehicle, a license plate, a car logo, and combinations thereof. In particular, the specific feature may further include specific characteristics associated with a license plate, such as number(s) thereon, character(s) or letter(s) thereon, color(s) thereof, a relative position of the license plate with respective to a vehicle to which the license plate is mounted, a surface texture thereof (e.g., smooth or rough), or the like.

In one embodiment, the image recognition unit 24 first determines whether the video data contains a video portion that matches the appearance of a vehicle; the image recognition unit 24 then determines whether the video data contains a video portion that matches the license plate. In particular, determination of the video portion that matches the license plate may be realized based on color identification.

It should be noted that since image recognition is performed by the video file server 2 rather than by one of the driving recorders 1, data processing speed and accuracy of image recognition may be enhanced.

Figure 3:
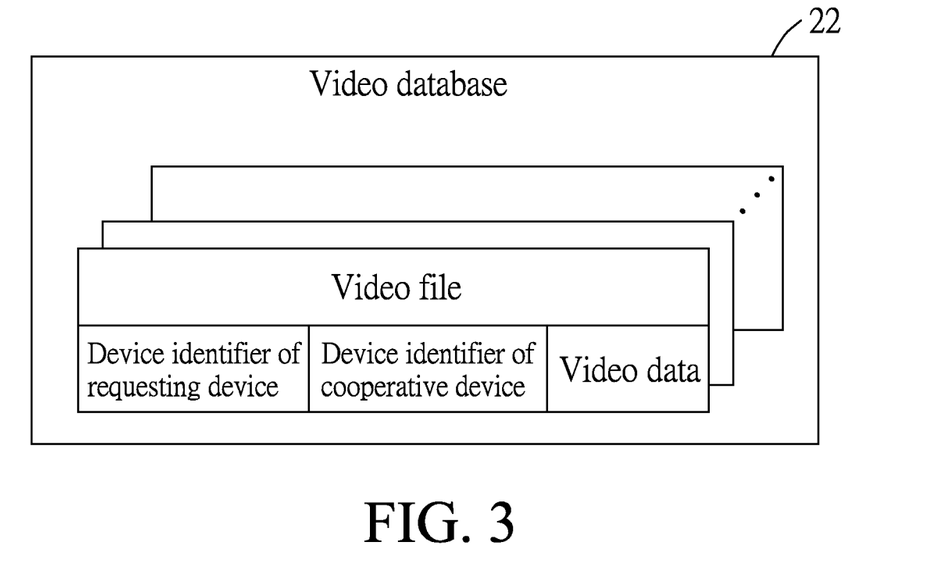
FIG. 3 is a block diagram illustrating an embodiment of a video database of the video file server of the system according to the disclosure.

When it is determined by the image recognition unit 24 that the video data contains a video portion that matches the specific feature, the management unit 23 tags the video file with a predetermined mark and stores the video file thus tagged in the video database 22 as shown in FIG. 3. On the other hand, when it is determined by the image recognition unit 24 that the video data does not contain a video portion that matches the specific feature, the management unit 23 directly stores the video file in the video database 22.

In one embodiment, for each of the at least one cooperative device, the management unit 23 is configured to determine whether the supported frame rate contained in the video file is not smaller than a predetermined frame rate (e.g., 60 frames per second, which is usually regarded as a high frame rate). When it is determined that the supported frame rate contained in the video file is not smaller than the predetermined frame rate, the management unit 23 tags the video file with a predefined mark to indicate that the video file is recorded at high frame rate and may be eligible for slow-motion playback, and then stores the video file thus tagged in the video database 22. Otherwise, the management unit 23 is configured to, when it is determined that the supported frame rate contained in the video file is smaller than the predetermined frame rate, directly store the video file in the video database 22.

It should be noted that the video file stored in the video database 22 may be tagged with both the predetermined mark and the predefined mark, or be tagged with only one of the predetermined mark and the predefined mark, or be tagged with neither the predetermined mark nor the predefined mark. Since the video files have been classified by tagging (or not) each of the video files with the predetermined mark and the predefined mark based respectively on existence of the specific feature (e.g., the appearance of a vehicle, a license plate or a car logo) and the supported frame rate, the registered user may be able to efficiently search for the video file(s) that may be relatively helpful in serving as evidence for the target event from among a great number of video files collected by the video file server 2. That is to say, the registered user does not have to spend a lot of time and effort on inspecting the video files that may contain no useful information, or that may be recorded at low frame rate or that is blurry or unclear.

Then, the management unit 23 is configured to search for one of the plural entries of registration data, the device identifier contained in which matches the device identifier that is contained in the video file corresponding to one of the at least one cooperative device and that represents the requesting device 1'. Thereafter, the management unit 23 is configured to communicate with the user device based on the contact information contained in the one of the plural entries of registration data located upon the search, and to send a success notification of video data collection to the user device so as to notify the registered user of the success of the video data collection. Notified by the success notification of video data collection, the registered user may access the video file(s) stored in the video file server 2 by means such as download via a direct download link.

In one embodiment, the management unit 23 is configured to encrypt, for each of the at least one cooperative device, the video file thus stored to result in another encrypted file by utilizing the first public key contained in the one of the plural entries of registration data located upon the search. Then, the management unit 23 is configured to send to the user device the success notification that contains, for each of the at least one cooperative device, the another encrypted file. By executing preinstalled application software, the user device is able to be connected with the requesting device 1' and to request the first private key. After that, the user device is able to decrypt, for each of the at least one cooperative device, the another encrypted file contained in the success notification received from the video file server 2 by utilizing the first private key which is provided by the requesting device 1'.

In one embodiment, the video files and related data stored in the video database 22 within each fixed time period are packaged in a data block by using cryptographic algorithms related to blockchain, and the data block is added to a blockchain managed by a blockchain network such as Ethereum. The blockchain network includes a lot of nodes, each of which is capable of checking, by using a cryptographic hash function, whether any one of the data blocks has been altered so as to prevent data-tampering and ensure data authenticity of the data blocks. Checking whether the data blocks have been altered consumes computational resources of the blockchain network (e.g., Ethereum), and thus the expense incurred may be paid by the requesting device 1' when the requesting device 1' transmits a request to the video file server 2 for accessing the video file(s).

It should be noted that in one embodiment, the time for uploading the video file(s) to the video file server is as short as possible, and processing actions performed by the video file server 2 on each of the video file(s) and time points of performing the processing actions are recorded. In this way, the risk of the video file(s) being tampered with when being uploaded to the video file server 2 may be reduced, and history of processing each of the video file(s) may be traced for future use and may be utilized as evidence in a dispute (e.g., lawsuit).

In one embodiment, for the purpose of reducing cost incurred from uploading the video file(s) to the video file server 2 and for the purpose of enhancing usability of the video file(s) provided to the video file server 2, the driving recorder 1 performs a preliminary classification on the video file(s) generated thereby before transmitting the video file(s) to the video file server 2 so as to exclude in advance any video file that would be unhelpful from the lot that is to be transmitted to the video file server 2. It is worth to note that since computational resources of the driving recorder may be limited, the preliminary classification exemplarily delineated in the following paragraphs involves basic image processing, rather than the image recognition performed by the image recognition unit 24 of the video file server 2.

Firstly, the requesting device 1' provides location information related to the current position of the requesting device 1' when broadcasting the video request, and each of the cooperative devices calculates a relative position and a relative direction of the cooperative device relative to the requesting device 1' based on the location information thus broadcasted. The relative position and the relative direction thus calculated may be utilized as a reference for identifying one of the cooperative devices that would record the video file(s) from a relatively better angle at a relatively better position than the others of the cooperative devices. Only the video file(s) recorded by the one of the cooperative devices thus identified will be transmitted to the video file server 2, and for the others of the cooperative devices, the video files recorded thereby are just marked for future use (i.e., the video files are not immediately transmitted when the others of the cooperative devices receive the video request).

Secondly, each of the cooperative devices divides an image captured thereby into plural sub-images, and performs contrast detection related to black and white on the sub-images so as to determine whether any one of the sub-images contains a specific feature, which may be associated with a license plate and which may indicate that the image contains a vehicle having the license plate.

Thirdly, each of the cooperative devices determines whether a traffic collision is recorded in the video data by determining whether the video data contains a video portion which is similar to an appearance of a vehicle adjoining another video portion which is similar to another appearance of a vehicle, or by determining whether the video data contains a video portion which varies rapidly based on comparison made across video frames of the video data.

It is worth to note that performance of the preliminary classification by the driving recorder 1 is slower than performance of the image recognition and matching by the video file server 2. In this way, data processing of the whole system may be accelerated, and system load of the cooperative device may be reduced.

Figure 5:
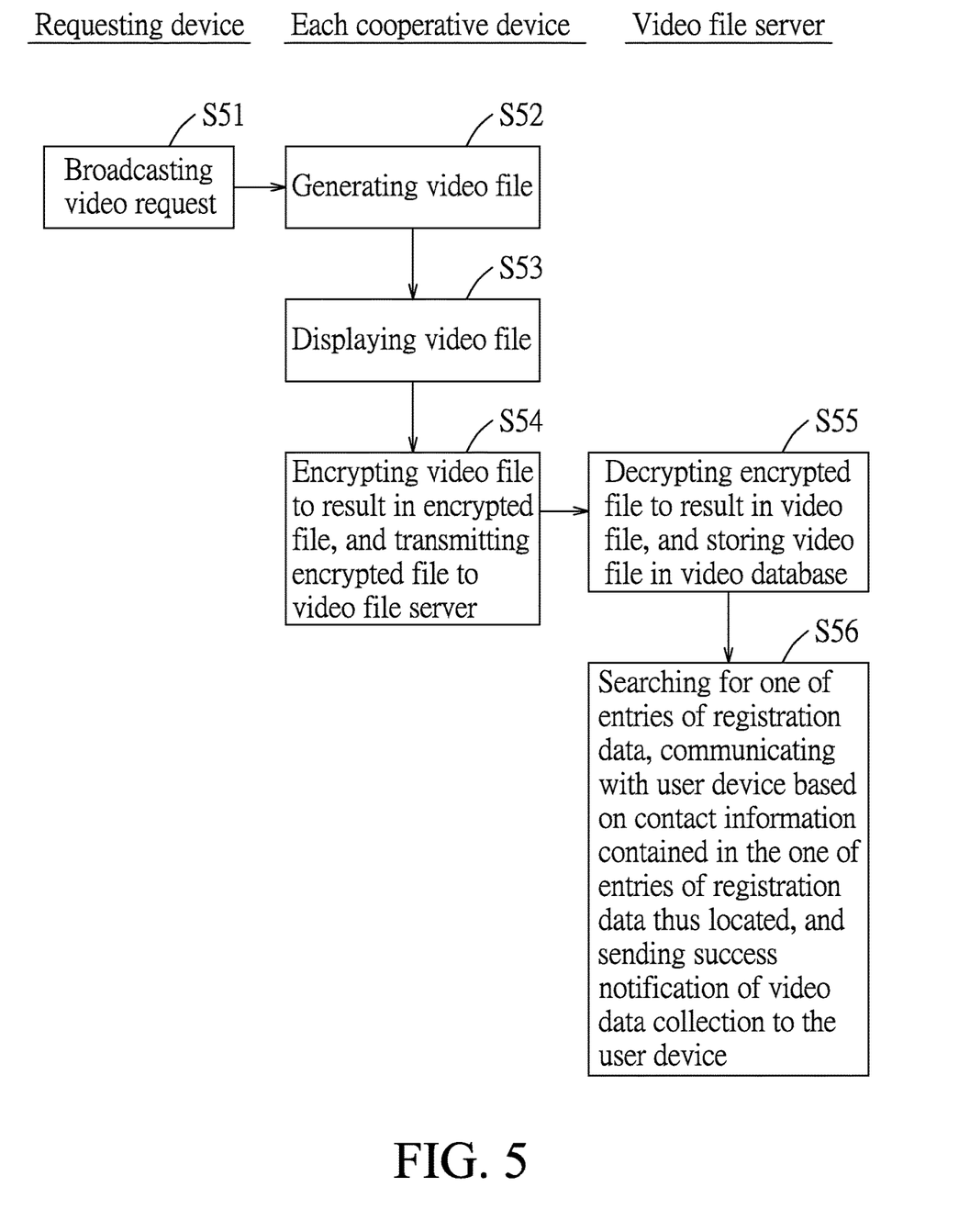
FIG. 5 is a flowchart illustrating an embodiment of a method for cooperatively collecting video data from driving recorders according to the disclosure.

Referring to FIGS. 1 and 5, an embodiment of a method for cooperatively collecting video data from driving recorders according to the disclosure is illustrated. The method is adapted to be implemented by the system 100 that is previously described. For explanation, the at least one cooperative device is exemplified to be four in number in this embodiment. The method includes steps S51 to S56 delineated below.

In step S51, in response to occurrence of the predetermined driving event (e.g., deceleration sensed by the accelerometer reaching the preset value) or receipt of the control input, the processor 14 of the driving recorder 1, which serves as the requesting device 1', generates the video request and broadcasts the video request via the communication unit 11 of the requesting device 1' by using wireless communication techniques. The video request contains the device identifier that uniquely represents the requesting device 1'. After that, steps S52 to S54 are performed for each of the driving recorders 1 serving as a cooperative device.

Steps 52 to S54 are to be performed by every cooperative device, and the description will be made with respect to a single cooperative device.

In step S52, in response to receipt of the video request from the requesting device 1', the processor 14 of the cooperative device generates the video file. The video file contains the device identifier that uniquely represents the requesting device 1', the device identifier that uniquely represents the cooperative device, and the video data that was recorded at the supported frame rate during the predefined time period.

In step S53, the processor 14 of the cooperative device controls the user input/output interface 15 to display the video file, such that a user (e.g., a driver or a passenger) in the vehicle 200 where the cooperative device is mounted is able to check the video file. Subsequently, a flow of the method proceeds to step S54 when the processor 14 of the cooperative device obtains via the user input/output interface 15 the confirmation input which indicates that the user has checked the video file.

In step S54, the processor 14 of the cooperative device encrypts the video file by utilizing the second public key stored in the storage 13 to result in the encrypted file, and transmits the encrypted file via the communication unit 11 to the video file server 2 by using wireless communication techniques.

It is noted that in a variation of this embodiment, for each of the cooperative devices, the processor 14, subsequent to step S52 and prior to step S54, further performs the preliminary classification on the video file(s) generated thereby be fore transmitting the video file(s) to the video file server 2 so as to exclude in advance any video file that would be unhelpful from the lot that is to be transmitted to the video file server 2. As what have been previously described, the preliminary classification involves basic image processing which is performed at a slower pace, rather than the image recognition performed at a faster pace by the image recognition unit 24 of the video file server 2.

In step S55, with respect to each of the encrypted files received from the cooperative devices, the management unit 23 of the video file server 2 decrypts the encrypted file by utilizing the second private key stored in the management unit 23 to result in the video file, and then stores the video file in the video database 22. Eventually, the video files stored in the video database 22 that correspond to this particular occurrence of the predetermined driving event may be four in number in this embodiment. As shown in FIG. 3, each of the video files contains the video data, and the device identifiers that respectively represent the requesting device 1' and a respective one of the cooperative devices.

Figure 6:
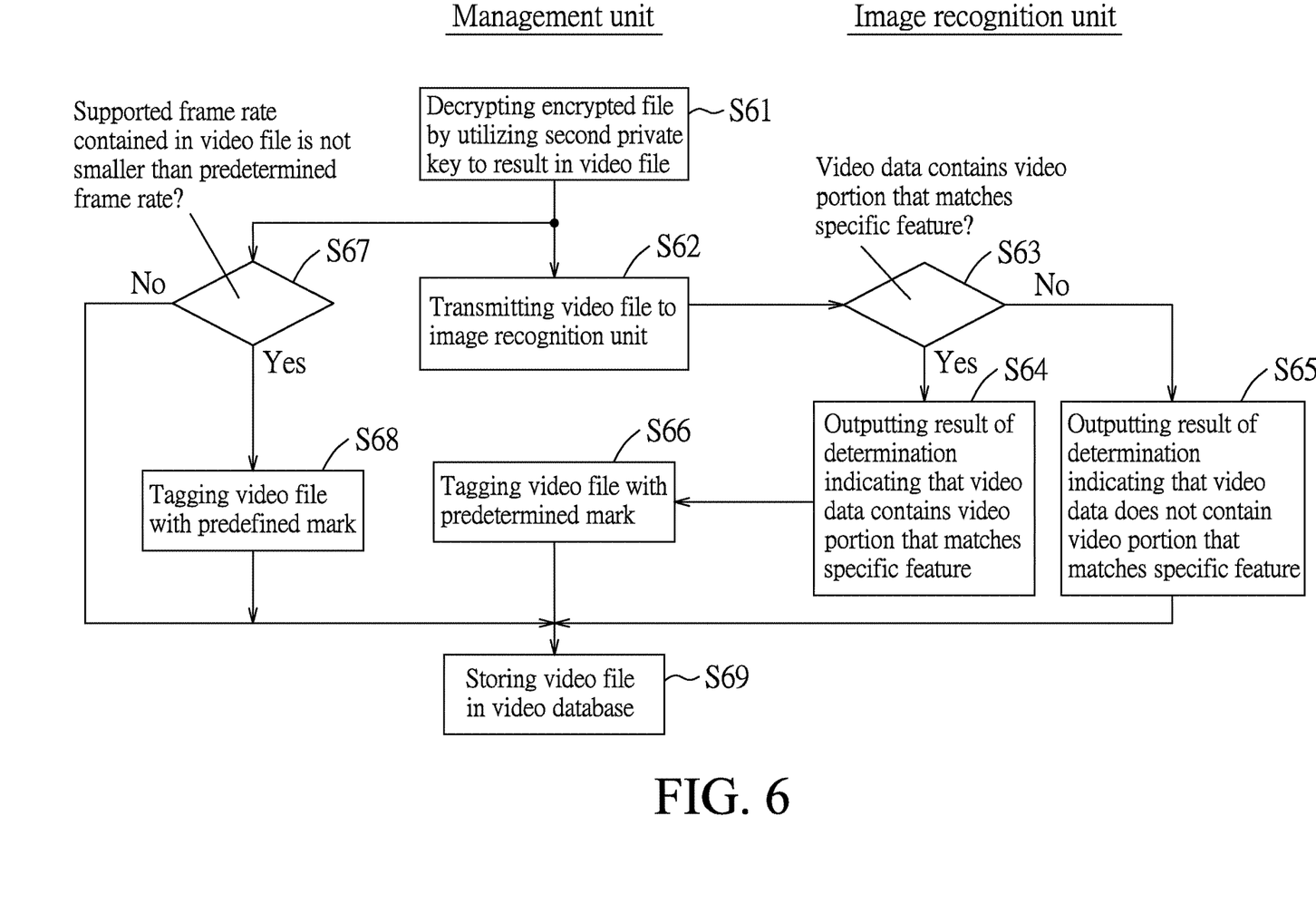
FIG. 6 is a flowchart illustrating an embodiment of sub-steps performed by a video file server in the method according to the disclosure.

In one embodiment, step S55 further includes sub-steps S61 to S69 shown in FIG. 6 and delineated below with respect to each of the encrypted files.

In sub-step S61, the management unit 23 decrypts the encrypted file by utilizing the second private key to result in the video file.

In sub-step S62, the management unit 23 transmits the video file thus decrypted to the image recognition unit 24. Then, the flow of the method proceeds to sub-step S63.

In sub-step S63, the image recognition unit 24 performs image recognition on the video data contained in the video file, and determines whether the video data contains a video portion that matches the specific feature (e.g., an appearance of a vehicle, a license plate or a car logo) based on the result of performance of the image recognition. When it is determined that the video data contains a video portion that matches the specific feature, the flow of the method proceeds to sub-step S64. Otherwise, when it is determined that the video data does not contain a video portion that matches the specific feature, the flow of the method proceeds to sub-step S65.

In sub-step S64, the image recognition unit 24 outputs to the management unit 23 a result of determination indicating that the video data contains a video portion that matches the specific feature, and the flow of the method proceeds to sub-step S66. In sub-step S66, the management unit 23 tags the video file with the predetermined mark, and the flow of the method proceeds to sub-step S69 in which the video file is stored in the video database 22.

In one embedment, when it is determined by the image recognition unit 24 that the video data contains a video portion that matches the specific feature (i.e., the appearance of a vehicle, a license plate or a car logo), the management unit 23 further tags the video file with an indication of duration of a time span within which the specific feature appears. For example, when it is determined that the video portion that matches the license plate appears from 1 minute 30 seconds to 1 minute 45 seconds of the playback time of the video data, the management unit 23 tags the video file with the indication of duration of "15 seconds". In one embodiment, when it is determined that a video portion that matches part of a car logo appears at 1 minute 30 seconds, continues to be visible, and disappears at 1 minute 45 seconds, and that no video portion that matches a license plate exists at 1 minute 30 seconds but a video portion that matches a license plate appears before 1 minute 45 seconds, the management unit 23 also tags the video file with the indication of duration of "15 seconds".

In sub-step S65, the image recognition unit 24 outputs to the management unit 23 the result of determination indicating that the video data does not contain any video portion that matches the specific feature, and the flow of the method proceeds to sub-step S69 so as to directly store the video file.

In addition, after decrypting the encrypted file to result in the video file in sub-step S61, the flow of the method proceeds to sub-step S67.

In sub-step S67, the management unit 23 determines whether the supported frame rate contained in the video file is not smaller than the predetermined frame rate. When it is determined that the supported frame rate contained in the video file is smaller than the predetermined frame rate, the flow of the method proceeds to sub-step S69 to directly store the video file in the video database 22. Oppositely, when it is determined that the supported frame rate contained in the video file is not smaller than the predetermined frame rate, the flow of the method proceeds to sub-step S68.

In sub-step S68, the management unit 23 tags the video file with the predefined mark, and then the flow of the method proceeds to sub-step S69 in which the video file is stored in the video database 22.

In step S56 that follows step S55, the management unit 23 searches the video database 22 for one of the plural entries of registration data whose device identifier matches the device identifier which is contained in the video file that corresponds to one of the cooperative devices and which represents the requesting device 1'. Following that, the management unit 23 communicates with the user device based on the contact information contained in the one of the plural entries of registration data thus located based on the search, and sends the success notification of video data collection to the user device so as to notify the registered user of the success of the video data collection.

In summary, regarding the method and system for cooperatively collecting video data from driving recorders according to the disclosure, the driving recorder 1 that serves as the requesting device 1' broadcasts the video request. In response to receipt of the video request, each of the at least one driving recorder 1 that serves as the cooperative device generates the video file, encrypts the video file to result in the encrypted file, and transmits the encrypted file to the video file server 2. For each of at least one encrypted file received from the at least one cooperative device, the video file server 2 decrypts the encrypted file to result in the video file, and stores the video file. Eventually, the video file server 2 sends the success notification of video data collection to the user device assigned by the registered user who corresponds to the requesting device 1' based on the contact information contained in one of the entries of registration data that is found to correspond to the requesting device 1'. Since the video data is collected from at least one source different from the requesting device 1', completeness of video recording of the target event may be enhanced. In addition, since each of the video file(s) is encrypted for access control, privacy of the registered user may be protected. Moreover, the video data collected by the video file server 2 has been classified by tagging the video file(s) based on existence of specific features and the supported frame rate, thereby facilitating further utilization of the video data by the registered user.

In the description above, for the purposes of explanation, numerous specific details have been set forth in order to provide a thorough understanding of the embodiments. It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for cooperatively collecting video data from driving recorders, the method adapted to be implemented by a video file server, and a plurality of driving recorders that are respectively mounted on a plurality of vehicles, the method comprising:

A) storing, by the video file server, plural entries of registration data that respectively correspond to the driving recorders, each of the plural entries of registration data containing a device identifier that uniquely represents the respective one of the driving recorders, and a piece of contact information that corresponds to a user device assigned by a registered user of the respective one of the driving recorders;

B) broadcasting, by one of the driving recorders that serves as a requesting device in response to one of occurrence of a predetermined driving event and receipt of a control input, a video request by using wireless communication techniques, the video request containing the device identifier that uniquely represents the requesting device;

C) generating, by each of at least one of the driving recorders that is within a predefined communication range with respect to the requesting device, that has received the video request, and that serves as one of at least one cooperative device, a video file in response to receipt of the video request, the video file containing the device identifier that uniquely represents the requesting device and that is contained in the video request, the device identifier that uniquely represents said one of the at least one cooperative device, and video data that was recorded by said one of the at least one cooperative device at a supported frame rate during a predefined time period that is related to a time point of receipt of the video request;

D) by each of the at least one cooperative device, encrypting the video file thus generated to result in an encrypted foe, and transmitting the encrypted file to the video file server by using wireless communication techniques;

E) by the video file server with respect to each of the encrypted file(s) received from the at least one cooperative device, decrypting the encrypted file to result in the video file, and storing the video file, wherein step E) includes sub-steps to be performed by the video file server with respect to each of the encrypted file(s) received from the at least one cooperative device of E1) performing image recognition on the video data contained in the video file, and determining whether the video data contains a video portion that matches a specific feature based on a result of performance of the image recognition, E2) when it is determined that the video data contains a video portion that matches the specific feature, tagging the video file with a predetermined mark and storing the video file thus tagged, and E3) directly storing the video file when it is determined that the video data does not contain a video portion that matches the specific feature; and F) by the video file server, searching for one of the plural entries of registration data, the device identifier contained in which matches the device identifier that is contained in the video file corresponding to one of the at least one cooperative device and that represents the requesting device, communicating with the user device based on the contact information contained in the one of the plural entries of registration data thus located after the search, and sending a success notification of video data collection to the user device.

2. The method as claimed in claim 1, prior to step B), further comprising:

G) storing, by each of the driving recorders, the device identifier that represents the driving recorder, a first private key that is assigned to the driving recorder and paired with a first public key, and a second public key that is paired with a second private key which is assigned to the video file server, wherein step A) includes storing, by the video file server, the second private key, each of he plural entries of registration data further containing the first public key, wherein step D) includes encrypting, by each of the at least one cooperative device, the video file generated in step C) by utilizing the second public key thus stored, and wherein step E) includes decrypting, by the video file server with respect to each of the encrypted file(s) received from the at least one cooperative device, the encrypted file by utilizing the second private key stored in the video file server.

3. The method as claimed in claim 2, wherein step F) includes, by the video file server with respect to each of the video file(s) stored in step E), encrypting the video file to result in another encrypted file, and wherein the success notification sent in step F) contains the another encrypted file(s) thus generated.

4. The method as claimed in claim 3, wherein step F) further includes, by the video file server with respect to each of the video file(s), encrypting the video file to result in the another encrypted file by utilizing the first public key contained in the one of the plural entries of registration data thus located upon the search, so that after the user device has been connected with the requesting device, the user device is able to decrypt the another encrypted file(s) contained in the success notification received from the video file server by utilizing the first private key which is provided by the requesting device.

5. The method as claimed in claim 2, wherein step E) further includes a sub-step to be performed with respect to each of the encrypted file(s) received from the at least one cooperative device of:

E4) decrypting the encrypted file by utilizing the second private key stored in the video file server to result in the video file.

6. The method as claimed in claim 5, wherein the specific feature includes one of an appearance of a vehicle, a license plate, a car logo, and combinations thereof.

7. The method as claimed in claim 5, subsequent to step C) and prior to step E), further comprising:

I) by each of the at least one cooperative device, performing a preliminary classification which involves basic image processing on the video file generated in step C), wherein performance of the preliminary classification by the cooperative device is slower than performance of the image recognition and matching by the video file server.

8. The method as claimed in claim 2, wherein:

step C) includes generating, by each of the at least one cooperative device, the video file that further contains the supported frame rate which is supported by the cooperative device; and step E) further includes sub-steps to be performed with respect to each of the encrypted file(s) received from the at least one cooperative device of E5) decrypting the encrypted file by utilizing the second private key thus stored to result in the video file, E6) determining whether the supported frame rate contained in the video file is not smaller than a predetermined frame rate, E7) when it is determined that the supported frame rate contained in the video file is not smaller than the predetermined frame rate, tagging the video file with a predefined mark and storing the video file thus tagged, and E8) directly storing the video file when it is determined that the supported frame rate contained in the video file is smaller than the predetermined frame rate.

9. The method as claimed in claim 1, subsequent to step C), further comprising:

H) by each of the at least one cooperative device, displaying the video file generated in step C), a flow of the method proceeding to step D) when the cooperative device obtains a confirmation input.

10. The method as claimed in claim 1, wherein in step C):

the predefined time period includes a first time interval right before the time point of receipt of the video request, and a second time interval right after the time point of receipt of the video request.

11. A system for cooperatively collecting video data from driving recorders, said system comprising:

a plurality of driving recorders to be respectively mounted on a plurality of vehicles, each of said driving recorders including a communication unit that is communicably connected to a communication network, and that supports wireless communication, an image capturing unit that is configured to record video data at a supported frame rate when the vehicle on which said driving recorder is mounted is started, a storage that is configured to store a device identifier which uniquely represents said driving recorder, and a processor that is electrically connected to said communication unit, said image capturing unit and said storage; and a video file server communicably connected to the communication network, and including a device database that is configured to store plural entries of registration data which respectively correspond to said driving recorders, each of the plural entries of registration data containing the device identifier that uniquely represents the respective one of said driving recorders, and a piece of contact information that corresponds to a user device assigned by a registered user of the respective one of said driving recorders, a video database, and a management unit that is electrically connected to said device database and said video database, wherein for one of said driving recorders that serves as a requesting device, said processor of said requesting device is configured to, in response to one of occurrence of a predetermined driving event and receipt of a control input, control said communication unit to broadcast a video request by using wireless communication techniques, the video request containing the device identifier that is stored in said storage, wherein for each of at least one of said driving recorders that is within a predefined communication range with respect to said requesting device, and that serves as one of at least one cooperative device, said processor of said cooperative device is configured to, when in receipt of the video request via said communication unit from said requesting device, generate a video file in response to receipt of the video request, the video file containing the device identifier that uniquely represents said requesting device and that is contained in the video request, the device identifier that uniquely represents the cooperative device and that is stored in said storage, and video data that was recorded by said image capturing unit in a predefined time period related to a time point of receipt of the video request, encrypt the video file thus generated to result in an encrypted file, and control said communication unit to transmit the encrypted file to said video file server by using wireless communication techniques, wherein said management unit of said video file server is configured to, for each of the encrypted file(s) received from the at least one cooperative device, decrypt the encrypted file to result in the video file, store the video file thus decrypted in said video database, search for one of the plural entries of registration data, the device identifier contained in which matches the device identifier which is contained in the video file that corresponds to one of said at least one cooperative device and which represents said requesting device, communicate with the user device based on the contact information contained in the one of the plural entries of registration data thus located upon the search, and send a success notification of video data collection to the user device, wherein said video file server further includes an image recognition unit electrically connected to said management unit, wherein said image recognition unit is configured to perform image recognition on the video data contained in the video file, and to determine whether the video data contains a video portion matching a specific feature based on a result of performance of the image recognition, and wherein said management unit is further configured to when it is determined by said image recognition unit that the video data contains a video portion that matches the specific feature, tag the video file with a predetermined mark and store the video file thus tagged in said video database, and when it is determined by said image recognition unit that the video data does not contain a video portion that matches the specific feature, directly store the video file in said video database.

12. The system as claimed in claim 11, wherein:

for each of said driving recorders, said storage of said driving recorder is configured to further store a first private key assigned to said driving recorder and paired with a first public key, and a second public key paired with a second private key that is assigned to said video file server;

said video file server is further configured to store the second private key, each of the plural entries of registration data further containing the first public key;

said processor of each of the at least one cooperative device is further configured to encrypt the video file thus generated by utilizing the second public key stored in said storage; and said management unit of said video file server is configured to decrypt, the encrypted file(s) received from the at least one cooperative device by utilizing the second private key stored in the video file server.

13. The system as claimed in claim 12, wherein said management unit is configured to encrypt, with respect to each of the video file(s) stored in said video database, the video file to result in another encrypted file, and to send to the user device the success notification that contains the another encrypted file(s) thus generated.

14. The system as claimed in claim 13, wherein said management unit is further configured to, with respect to each of the video file(s), encrypt the video file to result in the another encrypted file by utilizing the first public key contained in the one of the plural entries of registration data thus located upon the search, so that after the user device has been connected with said requesting device, the user device is able to decrypt the another encrypted file(s) contained in the success notification received from said video file server by utilizing the first private key which is provided by said requesting device.

15. The system as claimed in claim 12, wherein with respect to each of the encrypted file(s) received from the at least one cooperative device, said management unit is further configured to decrypt the encrypted file by utilizing the second private key stored in said video file server to result in the video file, and to transmit the video file thus decrypted to said image recognition unit.

16. The system as claimed in claim 15, wherein the specific feature includes one of an appearance of a vehicle, a license plate, a car logo, and combinations thereof.

17. The system as claimed in claim 15, wherein:

each of the at least one cooperative device is configured to perform a preliminary classification which involves basic image processing on the video file thus generated; and performance of the preliminary classification by said cooperative device is slower than performance of the image recognition and matching by said video file server.

18. The system as claimed in claim 12, wherein;

each of the at least one cooperative device is configured to generate the video file that further contains the supported frame rate which is supported by said cooperative device; and said management unit is further configured to
with respect to each of the encrypted file(s) received from said at least one cooperative device, decrypt the encrypted file by utilizing the second private key stored in said video file server to result in the video file,
determine whether the supported frame rate contained in the video file is not smaller than a predetermined frame rate,
when it is determined that the supported frame rate contained in the video file is not smaller than the predetermined frame rate, tag the video file with a predefined mark and store the video file thus tagged in said video database, and
when it is determined that the supported frame rate contained in the video file is smaller than the predetermined frame rate, directly store the video file in said video database.

19. The system as claimed in claim 11, wherein:
each of said driving recorders further includes a user input/output interface that is electrically connected to said processor; and
said processor of each of the at least one cooperative device is further configured to
control said user input/output interface to display the video file before said processor encrypts the video file and transmits the encrypted file via said communication device to said video file server, and
after said processor obtains a confirmation input via said user input/output interface, encrypt the video file to result in the encrypted file, and transmit the encrypted file via said communication device to said video file server.

20. The system as claimed in claim 11, wherein the predefined time period includes a first time interval right before the time point of receipt of the video request, and a second time interval right after the time point of receipt of the video request.

\* \* \* \* \*